G. W. BACHMAN.
Corn Husker.
No. 17,720.
Patented July 7, 1857.
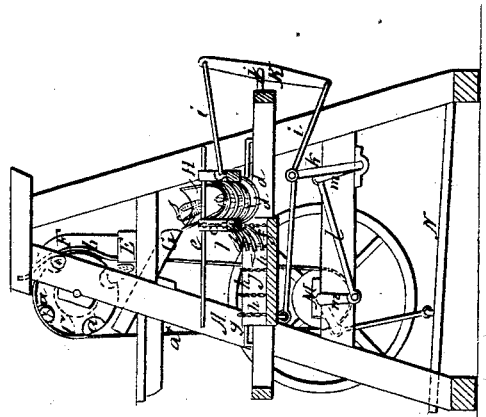
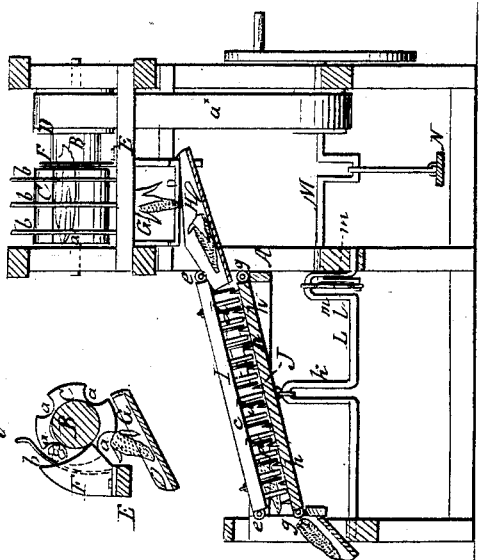
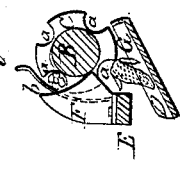
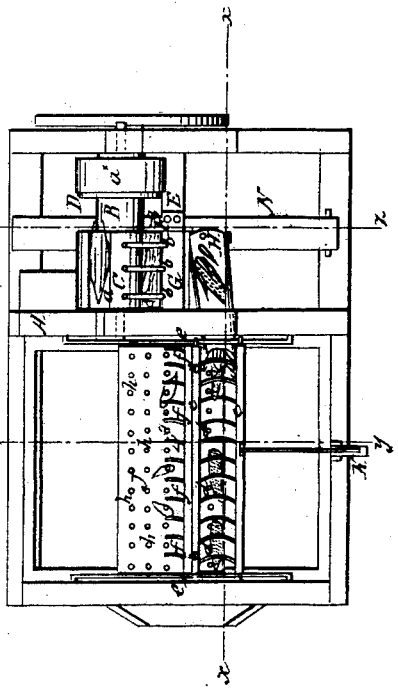

UNITED STATES PATENT OFFICE.

GEORGE W. BACHMAN, OF CLIFTON SPRINGS, NEW YORK.

MACHINE FOR HUSKING CORN.

Specification of Letters Patent No. 17,720, dated July 7, 1857.

*To all whom it may concern:*

Be it known that I, GEORGE W. BACHMAN, of Clifton Springs, in the county of Ontario and State of New York, have invented a new and Improved Machine for Husking Corn; and I do hereby declare that the following is a full, clear, and exact description of the same, reference being had to the annexed drawings, making a part of this specification, in which—

Figure 1 is a longitudinal vertical section of my improvement; $(x)$, $(x)$, Fig. 3 indicating the plane of section. Fig. 2 is a transverse vertical section of ditto; $(y)$, $(y)$, Fig. 3, showing the plane of section. Fig. 3 is a plan or top view of ditto. Fig. 4 is a transverse section of the grooved rotating cylinder and inclined spout; $(z)$, $(z)$, Fig. 3, indicating the plane of section.

Similar letters of reference indicate corresponding parts in the several figures.

My invention consists in the employment or use of a rotating grooved cylinder, elastic holders, and a knife used in connection with an inclined reciprocating screen, and clearer and rasp; the whole being combined and arranged as will be hereinafter fully shown and described whereby corn may be husked in an expeditious and perfect manner.

To enable those skilled in the art to fully understand and construct my invention, I will proceed to describe it.

A, represents a frame, which may be constructed of wood and in any proper manner, to support the working parts.

In the upper part of the frame A, a shaft B, is placed; said shaft having a cylinder C, upon it and a pulley D. The cylinder C, is grooved longitudinally, or is provided with longitudinal recesses $(a)$, which extend its whole length.

E, represents a cross piece in the frame A; said cross piece being just below and a little at one side of the cylinder C. To the cross piece E, wires or rods $(b)$, are attached; said rods being side by side, and project upward in a curved form corresponding to the curvature of the cylinder, as shown clearly in Fig. 4.

To the cross piece E, a knife F, is attached. This knife is placed near one end of the cylinder C; the cutting edge of the knife being quite close to the end of the cylinder. The knife F, may be constructed in any proper manner. It should be sufficiently broad to insure the requisite degree of stiffness, and its cutting edge may be somewhat concave, as shown clearly in Fig. 4.

Just below the cylinder C, an inclined spout or trough G is placed. To the lower end of the spout or trough G the upper end of an inclined spout or trough H, is pivoted. The spout or trough H, is placed at right angles with the lower end of the spout or trough G, and the lower end of spout H, is connected with a screen I, which is inclined and about in the same plane with the spout H. The screen I, is formed of two bars $(c)$, $(c)$, the upper and lower end of which are fitted on guide rods or bars $(e)$, $(e)$, attached to the frame. The two bars $(c)$, $(c)$, have wires $(d)$, attached to them; said wires being curved or bent in semicircular form, so as to form a sort of receptacle or basket to receive the ears of corn, as will be presently shown. To one of the bars $(c)$, wires $(f)$, are attached as shown plainly in Figs. 2 and 3. The wires $(d)$, and $(f)$, it will be seen are at right angles with the bars $(c)$, $(c)$.

Directly underneath the screen I, a board J is placed. The ends of this board are fitted on guide rods $(g)$, $(g)$, attached to the frame directly below the rods $(e)$, $(e)$. The board J is inclined so as to be parallel with the screen, and is provided with teeth or upright wires $(h)$, which are placed in rows on its upper surface.

Both the screen and toothed board are allowed to slide back and forth on their respective guide rods, and each has a rod $(i)$ attached to it; said rods being connected to opposite ends of a lever K, which works on a pin or center $(j)$. The rod $(i)$, of the board J, is connected to a crank $(k)$, on a shaft L. This shaft L, is connected with the driving shaft M, of the machine by a rod $(l)$, attached to cranks $(m)$, $(m)$, on both shafts.

The driving shaft M, may be operated by a foot treadle N, in any proper manner. The shaft B, is driven from the shaft M, by a belt $(a)$.

The operation is as follows: The ears of corn shown in red are placed within the grooves $(a)$, of the cylinder C, the butts or nubbins of the ears being at the side or end adjoining the knife F. As the cylinder C rotates the butts or nubbins are cut off by the knife F; the ears being retained within the grooves by the springs $(b)$. The ears as the nubbins or butts are cut off from them fall on the inclined trough G, and from thence into the spout H, which has a vibrating motion given it in consequence of its connection with the screen I, and the ears pass down from the spout H into the screen I, and have their husks stripped from them by the teeth (*h*) of the board J; the screen and board moving in opposite directions in consequence of their connection with the driving shaft as shown, the teeth passing between the wires of the screen. The wires (*f*), serve to strip the husks from the teeth (*h*), keeping the teeth clean so that they will always work efficiently. The husked ears fall from the depressed end of the screen I.

The above machine is extremely simple and will work efficiently and rapidly. It may be cheaply constructed, and there are no parts liable to get out of repair.

Having thus described my invention, what I claim as new, and desire to secure by Letters Patent, is:

The grooved cylinder C, wires (*b*), and knife F, in combination with the reciprocating screen I, provided with clearing teeth (*f*) and the reciprocating toothed board J; the whole being arranged to operate conjointly as shown, for the purpose set forth.

GEORGE W. BACHMAN.

Witnesses:
G. W. KENDALL,
RICHARD MESSINGER.